United States Patent [19]

Grayson, Jr.

[11] 4,137,976
[45] Feb. 6, 1979

[54] METHOD AND APPARATUS FOR BALE WEIGHT CONTROL

[75] Inventor: Allen M. Grayson, Jr., Charlotte, N.C.

[73] Assignee: Fiber Industries, Inc., Charlotte, N.C.

[21] Appl. No.: 795,045

[22] Filed: May 9, 1977

[51] Int. Cl.² ................... G01G 19/04; G01G 19/52
[52] U.S. Cl. ............................... 177/1; 177/25; 177/50; 364/567
[58] Field of Search ............... 177/1, 25, 70, 50; 364/567, 568

[56] References Cited

U.S. PATENT DOCUMENTS

| | | | |
|---|---|---|---|
| 3,425,501 | 2/1969 | Ganko | 177/70 |
| 3,522,853 | 8/1970 | Fluur et al. | 177/1 |
| 3,655,002 | 4/1972 | Jones et al. | 177/70 |
| 3,685,602 | 8/1972 | Mayer | 177/70 |
| 3,708,026 | 1/1973 | Senour | 177/70 X |
| 3,814,914 | 6/1974 | List et al. | 177/50 X |
| 3,834,473 | 9/1974 | Girard et al. | 177/50 X |
| 3,939,928 | 2/1976 | Murakimi et al. | 177/1 X |
| 3,945,448 | 3/1976 | Sellers | 177/25 |
| 3,977,483 | 8/1976 | Greanias | 177/1 |
| 3,995,517 | 12/1976 | Smith | 177/50 X |

*Primary Examiner*—George H. Miller, Jr.
*Attorney, Agent, or Firm*—Herbert M. Adrian, Jr.

[57] ABSTRACT

The total weight of fibrous material delivered to a packaging device, such as staple textile fiber delivered to a baling press, is controlled so as to facilitate achieving more uniform package weight in accordance with a method and through the use of an apparatus in which material is successively accumulated into batches, each of which is a fractional portion of a desired package weight. Batches are accumulated and released as the actual weight of each delivered batch is determined and registered and the registered actual weights of the successive batches are totaled. The weight of at least certain batches in the succession is then adjusted in such a manner as to closely control the total weight. A weigh container having an inlet and an outlet is interposed between and operatively communicates with a source of supply of fibrous material, such as a tow cutter, and a packaging device, such as a baling press. A load cell is provided which signals the weight of material supported by the weigh container.

25 Claims, 4 Drawing Figures

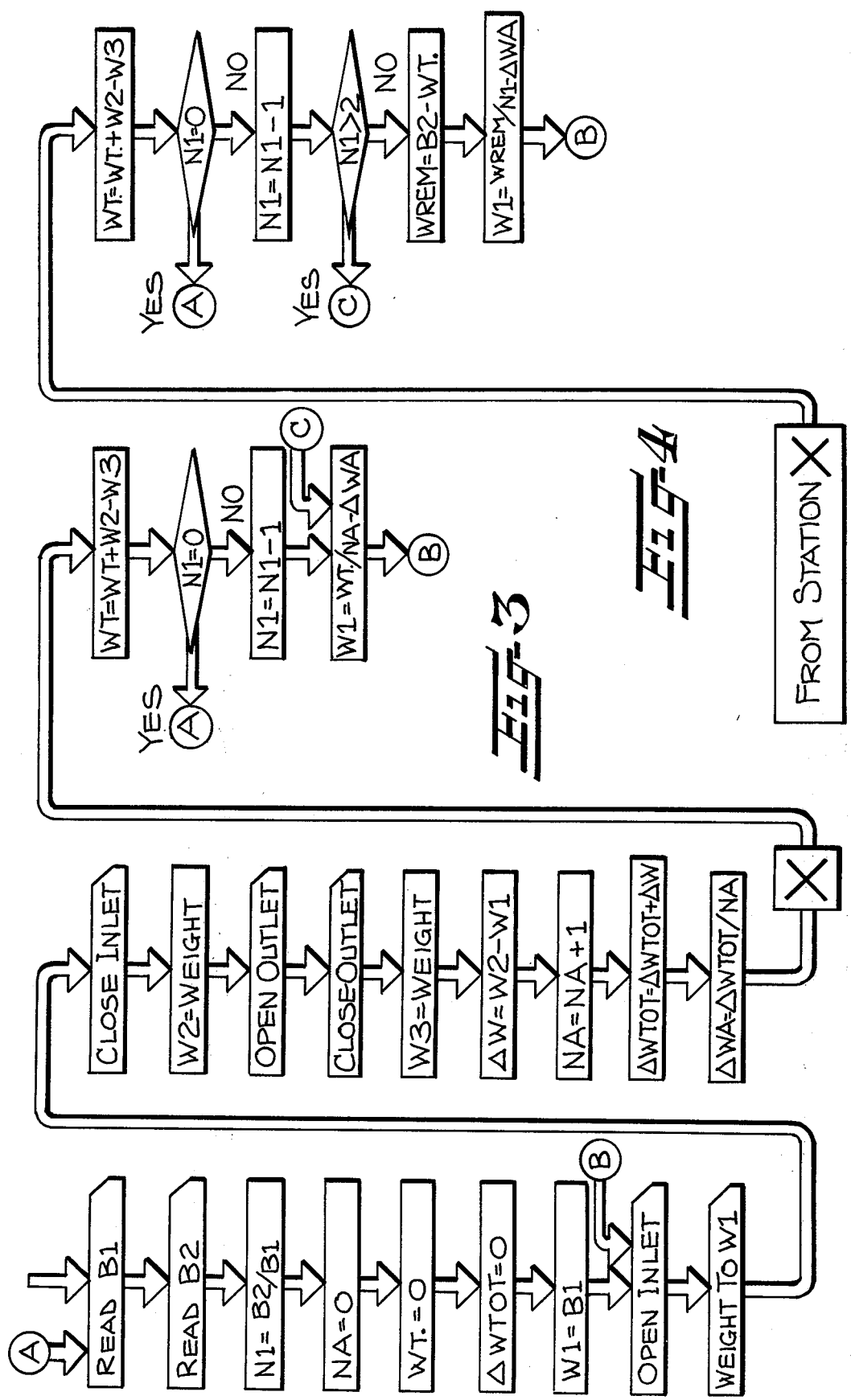

METHOD AND APPARATUS FOR BALE WEIGHT CONTROL

Certain fibrous materials which are sold primarily by weight measure are processed or manufactured in substantially continuous processes. One example of such a material is staple textile fiber, which is commonly sold by fiber processors or producers to textile manufacturers on a weight basis. Staple textile fiber includes natural fibrous materials such as cotton, wool and flax as well as man-made or synthetic fibrous materials such as nylon, cellulose acetate, rayon, acrylics, polyester and polypropylene. Particularly with regard to man-made fibrous materials, the manufacture of the fiber is a substantially continuous process in which a tow is spun. Substantial effort has been denoted to the development of methods and apparatus for producing tow and cutting that tow into staple textile fiber in a substantially continuous manner.

As is true with other fluent or flowing materials sold by weight measure, it is desirable if not necessary for sellers and buyers of staple textile fiber to know substantially the exact weight measure of each package or bale and the total weight of material transferred in any particular transaction. Heretofore, particularly with staple textile fiber, the practice has been to package material and subsequently weigh the package of material to determine the actual weight of the package or bale. The package or bale is then marked with the actual weight and, if the bale weight is outside predetermined limits for weight variation tolerance, the bale is taken apart and reprocessed into other packages or bales.

As can be appreciated, substantial variation in bale or package weight from bale to bale introduces significant difficulty of inventory control in filling orders which may be expressed in terms of specific desired total weights. Further, and particularly with staple textile fiber, bales of significantly varying weights present difficulty for textile manufacturers seeking to blend fibers in a particularly desired weight ratio or percentage. In the specific instance of staple textile fiber, it has become common to encounter variations in bale weight on the order of sixty to one hundred pounds above or below a desired package weight, in circumstances where the desired package weight is in a range of from about four hundred fifty pounds to about eight hundred pounds. The percentage fluctuation represented can be appreciated as contributing to the difficulties encountered prior to development of the present invention.

With the aforementioned difficulties and deficiencies in mind, it is an object of this invention to facilitate achieving more uniform package or bale weights in the processing and handling of fibrous materials such as staple textile fiber. In realizing this object of the present invention, a continuing flow of fibrous material is divided into a succession of batches, each of which is a fractional portion of a desired package or bale weight. Batches are accumulated and released as required to deliver a total weight of material substantially equal to a desired package weight, while the actual delivered weights of successive batches are determined, registered and totaled. The weight of at least certain batches in the succession is adjusted as required for closely controlling the total weight of material delivered.

Another object of this invention is to package fibrous materials in packages of consistently substantially equal weight. In realizing this object of the present invention, successive packages formed are each formed to have the same weight, within close tolerances. Thus, transfer of a desired total weight of fiber in any transaction is simplified in that packages or bales of standardized weight may be selected at random rather than requiring careful selection of packages totaling the desired weight.

A further object of this invention is to take into account, in achieving a desired total package weight, quantities of staple textile fiber which may for various reasons and varying lengths of time be delayed in movement to a baling press or packaging means. More particularly, in the event that a given quantity of fiber for some reason is inadvertently trapped or hung up in the flow path of material being batched and weighed, the arrangement of the present invention determines and takes into consideration the weight of such fiber. In realizing this object of the present invention, control circuitry responds to load cell signals indicative of the weight of a weigh container and material supported thereby, with the response of the controller being such as to add or adjust subsequent weights as necessary to compensate for "in-flight" fiber and fiber inadvertently retained, all as described more fully hereinafter.

Yet a further object of this invention is to facilitate blending of fibrous materials delivered into a further manufacturing process. More particularly, the divison of a continuing flow of fibrous material into a succession of batches and adjustment of weight of such batches is contemplated as accomplishing substantially continuous, on-going process control capable of delivering continuing flows of each of a plurality of different fibrous materials, thereby accomplishing blending of the materials in predetermined ratios.

Some of the objects and advantages of the invention having been stated, other objects and advantages will appear as the description proceeds when taken in conjunction with the accompanying drawings in which:

FIG. 3 is a program flow chart indicative of the steps of one program to be followed by control circuitry in the practice of the method of this invention; and FIG. 4 is a diagram similar to FIG. 3, illustrating an alternative series of steps to be followed by control circuitry.

While the present invention will be described hereinafter with more particular reference to the accompanying drawings, it is to be understood at the outset that the following more detailed description of this invention and the accompanying drawings are directed to the persons skilled in the applicable arts. It is anticipated that such persons skilled in such arts will be able, from the illustration and description of a presently preferred mode and arrangement of the present invention, to modify methods and apparatus while embodying the substance of the present invention. Accordingly, the following description is to be read as a broad teaching of this invention, and not as being restrictive on the scope of protection to which this invention of properly entitled.

Figure 1:
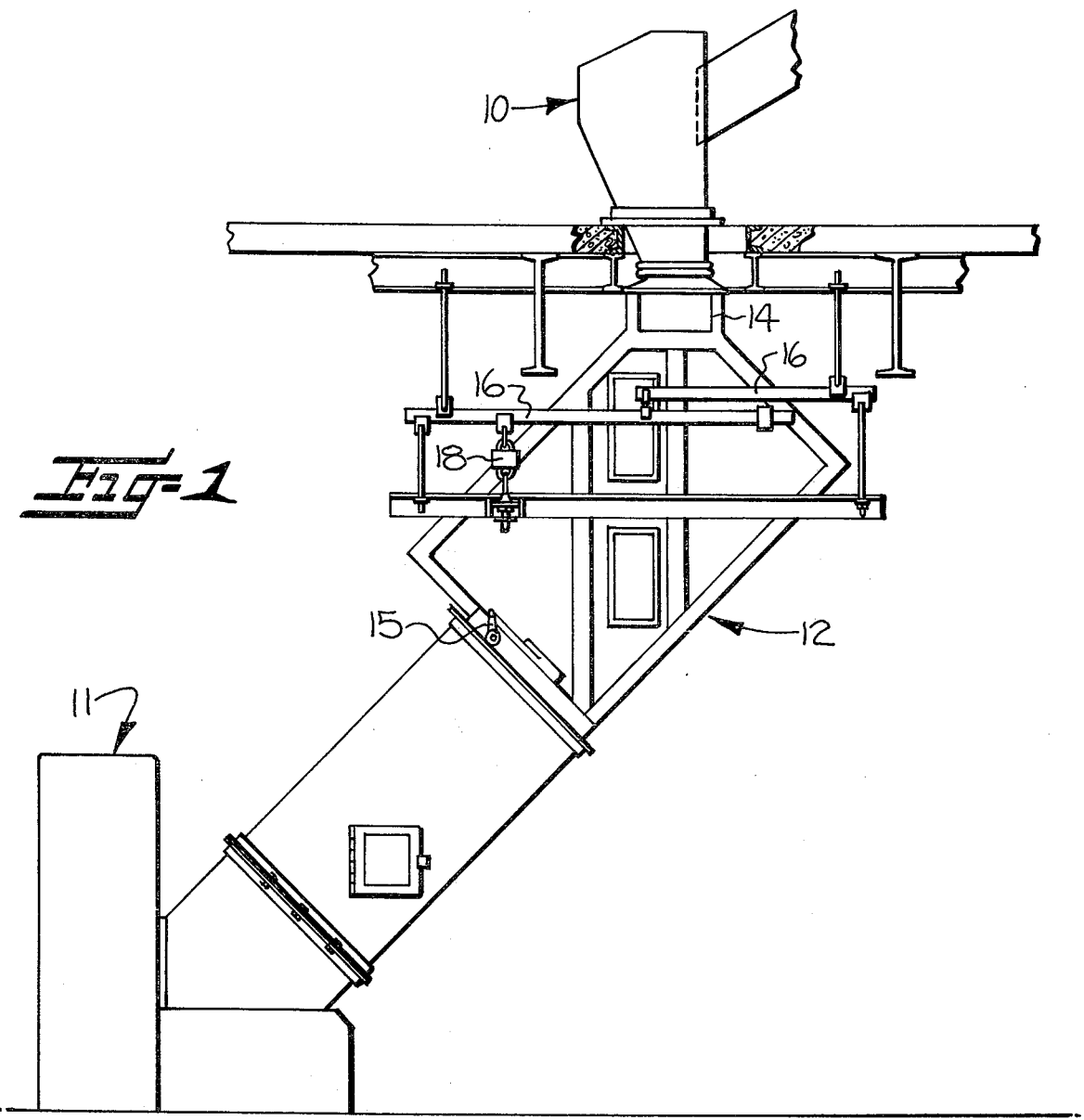
FIG. 1 is a schematic elevation view of certain apparatus incorporated in an operating embodiment of the present invention.

The present invention contemplates that fibrous material to be packaged or delivered to a subsequent manufacturing process such as a blending process is supplied in a continuing flow. More particularly, such material in the form of staple textile fiber results from the delivery of a filamentary textile tow from any appropriate and desired process and apparatus. The manufacture of such filamentary textile tow forms no part of the present invention and is well known to persons skilled in the applicable fiber producing arts. As is known to such persons, filamentary textile tow is commonly delivered to cutter means for cutting the filamentary textile tow into staple textile fiber. Again, the specific structure and operation of a tow cutter is known to persons skilled in the applicable arts and accordingly will not be here described in great detail. Interested readers may refer to relevant prior patents directed specifically to inventions relating to tow manufacture and cutting. Staple fiber cut by any such tow cutter is, in the apparatus of FIG. 1, delivered to a holding chute 10 by any suitable means.

Heretofore, staple textile fiber produced on a substantially continuous basis by cutting filamentary textile tow has been delivered to a packaging means in the form of a baler means or baling press. One form of baling press has been generally indicated at 11 in FIG. 1, but will not be here described in detail as detailed disclosures of baling presses are available to interested readers from prior patents issued in relevant arts. Similarly, blending apparatus suitable for receiving continuing flows of each of a plurality of different fibrous materials are known to skilled persons.

In accordance with the present invention, fibrous material in the form of staple textile fiber passes from the tow cutter to the baler 11 or to a blending apparatus (not shown) in a succession of batches accumulated in a weigh container generally indicated at 12. The weigh container 12 has an inlet 14 and an outlet 15, each with respective means for opening and closing to respectively control admission of material into the weigh container from the tow cutter 10 and delivery of material from the tow cutter to the baler 11. The weigh container 12 is supported by an appropriate arrangement of balance beams 16, including a load cell 18 which responds to imposition of weight or force by the weigh container and its contents by signaling the load or weight imposed. Preferably, and as described more fully hereinafter, the load cell 18 produces an analog electrical signal indicative of force loading or weight to which the load cell 18 is subjected.

In accordance with the present invention, a programmed control circuit means preferably at least in part in the form of an electronic microprocessor indicated at 20 is operatively connected with the load cell 18 for receiving signals therefrom and with the inlet and outlet 14, 15 of the weigh container 12 for controlling the opening and closing thereof. The programmed control means additionally is connected with certain operator set input devices and certain digital display devices, as described more fully hereinafter. As will be described hereinafter, the programmed control means functions for determining the actual weight of a batch of fiber delivered to the baler, for registering the actual weight of the delivered batch, for opening and closing the inlet and outlet in sequence as required to accumulate and deliver successive batches having a total weight of fiber substantially equal to a desired bale weight, for determining and registering the actual weights of the successive batches while totaling the registered actual weights, and for adjusting the weight of at least certain batches in the succession for closely controlling the total weight of material delivered.

The present invention contemplates that the programmed control means may take a number of specific forms and may be selected from among available devices or by assembly of a plurality of such devices by persons skilled in the applicable arts, once an understanding of the present invention has been obtained by reading this description thereof. Accordingly, and due to the rapid rate of change of commercial products offered as programmed or programmable control means and as components thereof, the following description will not specifically indicate precise commercial devices to be employed. Instead, the functions sought will be described in a manner sufficient to inform the persons skilled in the appropriate art.

Figure 2:
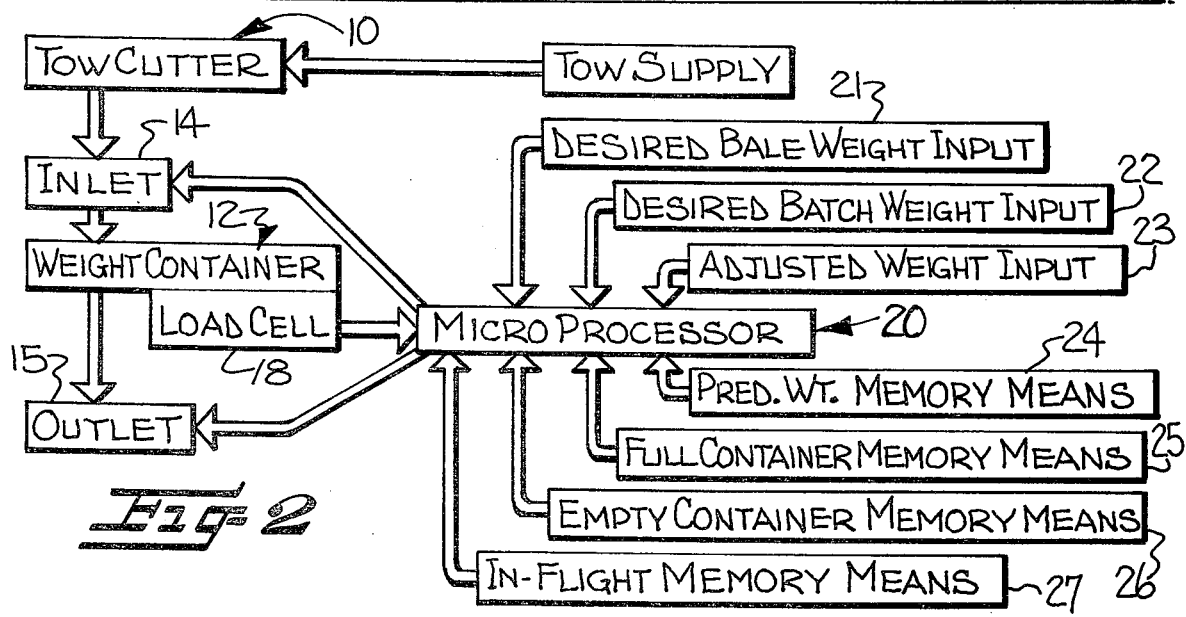
FIG. 2 is a schematic diagram of an apparatus in accordance with the present invention, arranged to illustrate the flow of material in accordance with the method of the present invention.

As illustrated in FIG. 2, separate memory areas are provided for certain recording functions to be described more fully hereinafter. As will be appreciated by knowledgeable persons, such memory areas are not usually readily definable in terms of specific hardware or components but are commonly defined by programming or "software". As a result, what has been shown and will be described as separate memory means can be and usually are accommodated within varying numbers and types of chips, magnetic devices and the like. The present description will not, for the reasons given above, attempt to fully review the range of such choices available to the skilled computer technologist. Similar input-output devices, sensors and the like will not be fully reviewed.

By way of example, the inlet 14 and outlet 15 may be operated pneumatically, hydraulically, electrically or by other appropriate means. Accordingly, it is contemplated that the control means either be compatible with such varying modes of actuation or be interfaced to the selected mode by an appropriate input or output device. As will be appreciated, the same circumstances apply with regard to the load cell means 18, as it is known that load cells signaling in various appropriate manners are available.

As indicated above, it is preferred that the programmed control means at least in part take the form of an electronic microprocessor 20. In such a form, appropriate input devices in the form of thumbwheel switches or the like are provided as a desired bale weight input device 21, a desired batch weight input device 22, and an adjusted weight input device 23. The input devices are mounted on or in a control cabinet, for access by an operator or supervisor as management may decide. Information manually set up or indicated on the input devices 20, 21, 23 is available to and may be employed by the microprocessor 20. The microprocessor operatively communicates with memory means either provided within the microprocessor or provided by selected auxiliary devices. In accordance with this invention, the memory means include a predetermined weight memory means 24, a full container memory means 25, and empty container memory means 26, and an "in-flight" memory means 27. Interaction among the various inputs, outputs and memory means is controlled by a central processing unit or processing means incorporated within the microprocessor 20 and possibly forming substantially the only component thereof.

The process of the present invention includes supplying a continuing flow of fibrous material, preferably by cutting filamentary textile tow into staple textile fiber through operation of the cutter 10 referred to herein-above. Under the control of the microprocessor 20, which may be set in motion by means of a manual start signal or by a program step as described hereinafter, the inlet 14 to the weigh container 12 is opened and fiber is admitted thereinto while the load cell 18 signals the weight of the container and fiber supported thereby. Signals originating from the load cell means 18 are received as an input by the microprocessor, which has carried into the predetermined weight memory means 24 the desired batch weight indicated by the setting of the appropriate input device 22, when the preparation of an idividual bale has just been initiated. Upon the signaled weight increasing to a predetermined weight corresponding to the weight recorded in the predetermined weight memory means 24, the inlet 14 is closed and the admission of fiber to the container 12 is stopped.

As will be appreciated, the desired batch weight and the weight indicated by the predetermined weight memory 24 may be substantially less than the quantity of fiber or material required to occupy the entirety of the weight container means 12. Accordingly, upon closure of the inlet 14, some fiber or material may be "in-flight" within the weigh container 12 and not be supported thereby so as to contribute to the total weight then instantaneously being signaled by the load cell means 18. Accordingly, a predetermined interval of time is allowed by the program of the microprocessor 20 for such "in-flight" material to settle within and be supported by the weigh container means 12. Thereafter, the microprocessor 20 records in the full container memory means 25 a signal originated from the load cell means 18 and indicative of the weight of the batch of fiber then supported within the weigh container means 12. The outlet 15 is then opened to release fiber from the weigh container means 12 to the baler 11.

The batch of fiber thus released has a weight which is a fractional portion of a desired bale weight, as manually indicated by the setting of the appropriate input device 21. Thus, it is necessary that a plurality of such batches be accumulated and released, in succession, in order to supply to the baler 11 that quantity of fiber or material which is to be packaged together. However, the successive batches have weights which are for a number of reasons subject to variance. In order to assure that the final total weight of material delivered for packaging closely approaches the desired bale weight, provision is made for determining the actual weight of each delivered batch. More particularly, after closure of the outlet 15 and prior to opening of the inlet 14, the microprocessor 20 again notes the weight of any fiber retained within the weigh container means 12 as signaled by the load cell means 18 and records a signal indicative of such weight in the empty container memory means 26. The availability of a recorded signal indicative of full container weight in the full container memory means 25 and a recorded signal indicative of empty container weight in the empty container memory means 26 permits comparison of the recorded signals so as to compute quite accurately the actual weight of the delivered batch of fiber.

As can be appreciated, the steps of opening and closing the inlet and outlet 14, 15 are repeated as required to deliver successive batches having a total weight substantially equal to the desired package weight, while the actual weights of the successive batches are determined and registered. As this occurs, the registered actual weights of the successive batches are totaled and preferably are displayed at some form of direct digital display device visible to an operator of the packaging system or the baler means 11. Repetition of the steps of delivering successive batches will, in accordance with the present invention, result in formation of successive packages of substantially equal weight. Thus, a succession of packages formed in accordance with this invention may be readily substituted one for another without unacceptably large fluctuation in the total fiber weight transferred. Similarly, repetition of the steps over more or less extended intervals of time result in delivery of fibrous material at a known rate of flow which facilitates other substantially continuous processes such as blending of different fibers.

In accordance with important characterizing features of this invention, the weight of at least certain batches in the succession is adjusted by the microprocessor 20 in order to more closely control the total weight of fiber delivered to the packaging or baler means 11 and so as to facilitate achieving more uniform bale weight. The present invention contemplates that the programming of programmed control circuitry means such as the microprocessor 20 may be accomplished by persons skilled in the applicable arts once an understanding of the present invention has been gained from the descripion provided herein. As one example of a set of instructions for a programmed control means, FIG. 4 of the accompanying drawings sets out a programming flow chart in which the symbol B1 indicates a batch weight as may be manually set on the desired batch weight input device 22 and the symbol B2 represents a desired bale weight as may be manually set at the desired bale weight input device 21. The symbol N1 represents the total number of batches required to deliver a total weight of fiber substantially equal to the desired bale weight, while the symbol NA represents the number of batches which have been previously delivered through the weigh container means in the process of delivering a desired bale weight of fiber. The symbol WT represents total weight actually delivered in a succession of batches, while $\Delta$ WTOT represents a total of "in-flight" weights computed during processing of a succession of batches. The symbol W1 is employed to represent the predetermined weight of material or fiber to be admitted to the weigh container means 12, as recorded in the predetermined weight memory means 24 and as adjusted during the progress of the program. The symbol W2 represents the weight of material in the weight container means 12 immediately prior to opening of the outlet 15, as may for example be recorded in the full container memory means 25. The symbol W3 represents the weight of any material or fiber which may be retained in the weight container means 12 after discharge of a batch therefrom, as may be recorded in the empty container memory means 26. The symbol $\Delta$ W represents the weight of "in-flight" fiber which is passing in the weigh container 12 immediately after closure of the inlet 14 and is subsequently supported by the weigh container means 12 prior to opening of the outlet 15, while the symbol $\Delta$ WA indicates a computed average of $\Delta$ W weights for successive batches.

As will be apparent to knowledgeable persons from FIG. 3 of the accompanying drawings and the above elucidation of the symbols there employed, the signal recorded in the predetermined weight memory means 24 may be adjusted during processing of each batch in the succession of batches, so that the accumulating total weight of fiber is continually adjusted to approximate an ideal staircase or stepwise increase to the desired total bale weight. An alternative program achieving substantially the same results may defer adjustment of the predetermined weight until the last few or one batch in a succession of batches. A program flow diagram for such an arrangement is indicated in FIG. 4, where symbols consistent with those described with reference to FIG. 3 have been used, with one exception. The program diagramed in FIG. 4 provides for the computation of a weight remaining to complete a desired bale weight, symbolized as WREM, which is compared with desired batch weight W1 in determining the programmed adjustment to be made to W1.

As a further alternative, this invention contemplates that the desired batch weight W1 for a known, predetermined number of final batches in a succession may be taken from a manually set input device such as the adjusted weight input device 23. In accordance with such a procedure, program determination that the number of batches delivered was within two (or some other suitable integer) of the number required would be followed by setting W1 to be the manually determined weight rather than a computed weight.

It has been determined that a succession of bales produced in accordance with the methods of this invention may be quite closely controlled as to the weight of each bale in the succession, thereby permitting any one bale in the succession to be substituted for any other one bale in warehousing or delivery of fiber. More specifically, a succession of bales having weights in the range of from about 450 pounds to about 800 pounds may be formed while holding the variation in bale weight of any given bale in the series to the range of from about 1 pound to about 8 pounds above or below the desired bale weight. Thus, the percentage fluctuation experienced will be in the range of no more than three percent of bale weight and preferably about one percent or less.

In the drawings and specification, there has been set forth a preferred embodiment of the invention, and although specific terms are employed, they are used in a generic and descriptive sense only and not for purposes of limitation.

That which is claimed is:

1. A process for forming more uniform weight packages of fibrous material comprising supplying a continuing flow of fibrous material, successsively accumulating said material into batches having weights which are subject to variance from batch to batch, each batch having a weight which is a fractional portion of a desired package weight, successively releasing the batches of material to a packager, determining the actual weight of each batch delivered to the packager and registering such actual weight while totaling the registered actual weights of the successive batches, adjusting the weight of at least certain batches in the succession based upon the registered actual weights to compensate for any variance in batch weights and thereby more closely control the total weight of material delivered to the packager and facilitate achieving more uniform package weight, and packaging the material which has been delivered to the packager.

2. A process according to claim 1 wherein the accumulating and then releasing a batch comprises admitting material to a weigh container while signaling the weight of material supported by the container, responding to the signaled weight increasing to a predetermined weight by stopping admission of material to the container, and thereafter opening the container for releasing the batch.

3. A process according to claim 1 wherein the accumulating and then releasing a batch comprises opening and then closing an inlet to a weigh container and opening and then closing an outlet from the container and further wherein the determining of the delivered weight of the batch comprises signaling the weight of accumulated material supported by the container after the closing of the inlet and before the opening of the outlet, signaling the weight of any material retained in the container after the closing of the outlet and before the opening of the inlet, and responding to the signaling of container and material weights by comparing the signaled weights.

4. A process according to claim 1 wherein the accumulating and then releasing a batch comprises admitting a predetermined weight of material to a weigh container and further wherein the adjusting of the weight of at least certain batches comprises varying the predetermined weight of material to be admitted to the container as required to achieve a desired total weight of material delivered.

5. A process for forming more uniform weight packages of staple textile fiber comprising cutting filamentary textile tow into staple textile fiber, accumulating fiber into a batch which is a fractional portion of a desired bale weight and then releasing the batch of fiber to a baler, determining the actual weight of the delivered batch after release thereof to the baler and registering the actual weight of the delivered batch, repeating the steps of accumulating and then releasing successive batches as required to deliver a total weight of fiber substantially equal to the desired bale weight while determining and registering the actual weights of the successive batches and all while totaling the registered actual weights of the successive batches, adjusting the weight of at least certain batches in the succession for closely controlling the total weight of fiber delivered to the baler and so as to facilitate achieving more uniform bale weight, and baling the fiber which has been delivered to the baler.

6. A process according to claim 5 wherein the accumulating and then releasing a batch comprises admitting fiber to a weigh container while signaling the weight of fiber supported by the container, responding to the signaled weight increasing to a predetermined weight by stopping admission of fiber to the container, and thereafter opening the container for releasing the batch.

7. A process according to claim 5 wherein the accumulating and then releasing of each batch comprises opening and then closing an inlet to a weigh container and opening and then closing an outlet from the container and further wherein the determining of the delivered weight of the batch comprises signaling the weight of accumulated fiber supported by the container after the closing of the inlet and before the opening of the outlet, signaling the weight of any fiber retained in the container after the closing of the outlet and before the opening of the inlet, and responding to the signaling of container and fiber weights by comparing the signaled weights.

8. A process according to claim 5 wherein the accumulating and then releasing of each batch comprises admitting a predetermined weight of fiber to a weight container and further wherein the adjusting of the weight of at least certain batches comprises varying the predetermined weight of fiber to be admitted to the container as required to achieve a desired total weight of fiber delivered.

9. A process for forming more uniform weight packages of staple textile fiber comprising cutting filamentary textile tow into staple textile fiber, opening an inlet to a weigh container and admitting fiber thereinto while electrically signaling the weight of fiber supported by the container, responding to the signaled weight increasing to a predetermined weight by closing the inlet and stopping admission of fiber to the container, opening and then closing an outlet from the container for accumulating fiber into a batch which is a fractional portion of a desired bale weight and then releasing the batch of fiber to a baler, electrically signaling the weight of accumulated fiber supported by the container after the closing of the inlet and before the opening of the outlet, electrically signaling the weight of any fiber retained in the container after the closing of the outlet and before the opening of the inlet, recording the electrically signaled weights and determining the actual weight of the delivered batch by comparing the recorded signals and recording an electrical signal indicative of the actual weight of the delivered batch, repeating the steps of opening and closing the inlet and outlet as required to deliver successive batches having a total weight of fiber substantially equal to the desired bale weight while determining and recording signals indicative of the actual weights of the successive batches and all while totaling the actual weights of the successive batches, varying the predetermined weight of fiber to be admitted to the container in accumulating at least certain batches in the succession for closely controlling the total weight of fiber delivered to the baler and so as to facilitate achieving more uniform bale weight, and baling the fiber which has been delivered to the baler.

10. Apparatus for forming more uniform weight packages of fibrous material and comprising means for supplying fibrous material; packaging means for packaging fibrous material; weigh container means having an inlet and an outlet each with respective means for opening and closing the same and respectively operatively communicating with said material supply means and said packaging means for admitting fibrous material from said supply means and for releasing material to be delivered to said packaging means in a succession of batches, said weigh container means supporting material as the material is accumulated into batches having weights which are subject to variance from batch to batch, each batch having a weight which is a fractional portion of a desired package weight; load cell means operatively connected with said weigh container means for signaling the weight of material supported by said weigh container means; and programmed control means operatively connected with said opening and closing means for controllably actuating said inlet and outlet and with said load cell means for receiving therefrom signals indicative of the weight of material supported by said weigh container means, said control means determining the actual weight of each batch delivered to said packaging means and registering such actual weight while totaling the registered actual weights and adjusting the weight of at least certain batches in the succession to compensate for variance in batch weights and thereby more closely control the total weight of material delivered to said packaging means.

11. Apparatus according to claim 10 wherein said control means comprises full container memory means responsive to closing of said inlet for recording a load cell signal indicative of the weight of material supported immediately before opening of said outlet, empty container memory means responsive to closing of said outlet for recording a load cell signal indicative of any weight of material retained immediately before opening of said inlet, and processing means responsive to signals recorded in said full container and empty container memory means for computing the actual weight of a delivered batch.

12. Apparatus according to claim 10 wherein said control means comprises processing means for monitoring load cell signals and responsive thereto for closing said inlet upon monitored load cell signals indicating that a predetermined weight of material has been accumulated and is being supported by said weigh container means, and further wherein said processing means is responsive to the registering and totaling of actual weights of successive batches for varying said predetermined weight for said at least certain batches.

13. Apparatus according to claim 10 wherein said control means comprises predetermined weight memory means for recording a signal indicative of a desired batch weight, full container memory means responsive to closing of said inlet for recording a load cell signal indicative of the weight of material supported immediately before opening of said outlet, and processing means responsive to signals recorded in said predetermined weight memory means and said full container memory means for computing the weight of material in-flight at the instant of closure of said inlet.

14. Apparatus for forming more uniform weight bales of staple textile fiber and comprising tow cutter means for cutting filamentary textile tow into staple textile fiber; baler means for baling fiber; weigh container means having an inlet and an outlet each with respective means for opening and closing the same and respectively operatively communicating with said tow cutter means and said baler means for admitting fiber from said tow cutter means and for releasing fiber to be delivered to said baler means in a succession of batches, said weigh container means supporting fiber as the fiber is accumulated into batches having weights which are subject to variance from batch to batch, each batch having a weight which is a fractional part of a desired bale weight; load cell means operatively connected with said weigh container means for signaling the weight of fiber supported by said weigh container means; and programmed control means operatively connected with said opening and closing means for controllably actuating said inlet and outlet and with said load cell means for receiving therefrom signals indicative of the weight of fiber supported by said weigh container means, said control means determining the actual weight of each batch delivered to said baler means and registering such actual weight of the delivered batch while totaling the registered actual weights and adjusting the weight of at least certain batches in the succession to compensate for variance in batch weights and thereby more closely control the total weight of fiber delivered to said baler means.

15. Apparatus according to claim 14 wherein said control means comprises full container memory means responsive to closing of said inlet for recording a load cell signal indicative of the weight of fiber supported immediately before opening of said outlet, empty container memory means responsive to closing of said outlet for recording a load cell signal indicative of any weight of fiber retained immediately before opening of said inlet, and processing means responsive to signals recorded in said full container and empty container memory means for computing the actual weight of the delivered batch.

16. Apparatus according to claim 14 wherein said control means comprises processing means for monitoring load cell signals and responsive thereto for closing said inlet upon monitored load cell signals indicating that a predetermined weight of fiber has been accumulated and is being supported by said weigh container, and further wherein said processing means is responsive to the registering and totaling of actual weights of successive batches for varying said predetermined weight for said at least certain batches.

17. Apparatus according to claim 14 wherein said control means comprises predetermined weight memory means for recording a signal indicative of a desired batch weight, full container memory means responsive to closing of said inlet for recording a load cell signal indicative of the weight of fiber supported immediately before opening of said outlet, and processing means responsive to signals recorded in said predetermined weight memory means and said full container memory means for computing the in-flight weight of fiber.

18. Apparatus for forming more uniform weight bales of staple textile fiber and comprising tow cutter means for cutting filamentary textile tow into staple textile fiber; baler means for baling fiber; weigh container means having an inlet and an outlet respectively operatively communicating with said tow cutter means and said baler means for receiving fiber from said tow cutter means and for supporting fiber accumulated into a batch which is a fractional part of a desired bale weight and then releasing the batch of fiber to be delivered to said baler means; load cell means operatively connected with said weigh container means for electrically signaling the weight of fiber supported by said weigh container means; and electronic programmed control circuitry means operatively connected with said inlet and outlet and with said load cell means, said control means comprising predetermined weight memory means for recording an electrical signal indicative of a desired batch weight, processing means for monitoring load cell signals and responsive to a comparison thereof with said weight memory means signal for closing said inlet upon monitored load cell signals indicating that a predetermined weight of fiber has been accumulated and is being supported by said weigh container, full container memory means responsive to closing of said inlet for recording a load cell signal indicative of the weight of fiber supported immediately before opening of said outlet, and empty container memory means responsive to closing of said outlet for recording a load cell signal indicative of any weight of fiber retained immediately before opening of said inlet; and further wherein said processing means is responsive to signals recorded in said weight memory means and said full container memory means and said empty container memory means for electrically computing the in-flight weight of fiber and the actual weight of a delivered batch after release thereof to said baler means, for registering the in-flight weight and the actual weight of the delivered batch, for opening and closing said inlet and outlet as required to deliver successive batches having a total weight of fiber substantially equal to the desired bale weight, for determining and registering the actual weights of the successive batches while totaling the registered actual weights, and for adjusting the weight of at least certain batches in the succession for closely controlling the total weight of fiber delivered to said baler means.

19. Apparatus for controlling the weight of fibrous material delivered from a means for supplying fibrous material to a receiver means for receiving fibrous material; the apparatus comprising weigh container means having an inlet and an outlet each with respective means for opening and closing the same and respectively operatively communicating with said material supply means and said receiver means for admitting fibrous material from said supply means and for releasing material to be delivered to said receiver means in a succession of batches, said weigh container means supporting material as the material is accumulated into batches having weights which are subject to variance from batch to batch, each batch having a weight which is a fractional portion of a desired total weight; load cell means operatively connected with said weigh container means for signaling the weight of material supported by said weigh container means; and programmed control means operatively connected with said opening and closing means for controllably actuating said inlet and outlet and with said load cell means for receiving therefrom signals indicative of the weight of material supported by said weigh container means, said control means determining the actual weight of each batch delivered to said packaging means and registering such actual weight while totaling the registered actual weights and adjusting the weight of at least certain batches in the succession to compensate for variance in batch weights and thereby more closely control the total weight of material delivered to said receiver means.

20. Apparatus for controlling the weight of staple textile fiber delivered from a means for supplying staple textile fiber to a receiver means for receiving fiber; the apparatus comprising weigh container means having an inlet and an outlet respectively operatively communicating with said supply means and said receiver means for receiving fiber from said supply means and for supporting fiber accumulated into a batch which is a fractional part of a desired total weight and then releasing the batch of fiber to be delivered to said receiver means; load cell means operatively connected with said weigh container means for signaling the weight of fiber supported by said weigh container means; and programmed control means operatively connected with said inlet and outlet and with said load cell means, said control means comprising predetermined weight memory means for recording a signal indicative of a desired batch weight, processing means for monitoring load cell signals and responsive to a comparison thereof with said weight memory means signal for closing said inlet upon monitored load cell signals indicating that a predetermined weight of fiber has been accumulated and is being supported by said weigh container, full container memory means responsive to closing of said inlet for recording a load cell signal indicative of the weight of fiber supported immediately before opening of said outlet, and empty container memory means responsive to closing of said outlet for recording a load cell signal indicative of any weight of fiber retained immediately before opening of said inlet; and further wherein said processing means is responsive to signals recorded in said weight memory means and said full container memory means and said empty container memory means for computing the in-flight weight of fiber and the actual weight of a delivered batch after release thereof to said receiver means, for registering the in-flight weight and the actual weight of the delivered batch, for opening and closing said inlet and outlet as required to deliver successive batches having a total weight of fiber substantially equal to the desired total weight, for determining and registering the actual weights of the successive batches while totaling the registered actual weights, and for adjusting the weight of at least certain batches in the succession for closely controlling the total weight of fiber delivered to said receiver means.

21. A method for controlling the weight of fibers being packed into a bale to a predetermined weight comprising continuously collecting a predetermined incremental quantity of fiber in a weigh container, sensing the weight of said incremental amount of fiber collected, temporarily interrupting the flow of fiber to said weigh container when said fiber weight reaches said predetermined incremental amount, recording said incremental weight at said interruption, discharging said collected fiber into a bale packer, computing the difference between said recorded weight and said predetermined incremental weight, repeating said incremental collecting, weighing, recording and discharging said incremental amounts of fiber a plurality of times while adjusting each succeeding increment of collected fiber weight an amount corresponding to the computed difference bwtween the total preceding weight increments and the total of the predetermined weight amounts and continuing said collecting of fiber in said bale to said predetermined total weight.

22. The method of claim 21 wherein the bale weight being measured totals 450 to 800 pounds.

23. The method of claim 21 wherein a microprocessor is used to compute and control the collecting, weighing, recording, discharging and adjusting of said incremental amounts.

24. The method of claim 21 wherein the fiber being packed into a bale is a staple fiber.

25. The method of claim 22 wherein the fiber is polyester fiber.

UNITED STATES PATENT AND TRADEMARK OFFICE
CERTIFICATE OF CORRECTION

PATENT NO. : 4,137,976

DATED : February 6, 1979

INVENTOR(S) : Allen M. Grayson, Jr.

It is certified that error appears in the above-identified patent and that said Letters Patent is hereby corrected as shown below:

Column 12, line 25, change "packaging" so as to read -- receiver --.

Signed and Sealed this

Twenty-fifth Day of November, 1986

Attest:

DONALD J. QUIGG

Attesting Officer      Commissioner of Patents and Trademarks